Oct. 14, 1924.

K. G. RUNBACK

AIR CONDITIONING APPARATUS

Filed Jan. 8, 1924

1,511,911

Inventor

Karl G. Runback

By Emil Bönnelycke

Attorney

Patented Oct. 14, 1924.

1,511,911

UNITED STATES PATENT OFFICE.

KARL G. RUNBACK, OF NEW YORK, N. Y., ASSIGNOR TO MIDWEST AIR FILTERS, INC., OF NEW YORK, N. Y., A CORPORATION OF NEW YORK.

AIR-CONDITIONING APPARATUS.

Application filed January 8, 1924. Serial No. 685,071.

*To all whom it may concern:*

Be it known that I, KARL G. RUNBACK, a subject of the King of Sweden, residing at New York, in the county and State of New York, have invented certain new and useful Improvements in Air-Conditioning Apparatus, of which the following is a specification.

This invention relates to an air-conditioning apparatus comprising an air filter arranged in a horizontal or inclined position, from which filter particles of oil or other liquid, or solid particles, may become detached and drop down. The invention relates specifically to the provision of means for collecting such liquid or solid particles as may fall from the filter, such means comprising a receptacle or series of receptacles adapted to be slidably or otherwise detachably secured beneath the filter.

The principal advantage derived from the invention is, that it prevents any particles which become detached from the filter from falling into any machinery beneath it, such, for instance, as a heater arranged close to a filter of the so-called semi-dry type, in which a filter medium coated with an oily liquid is used which changes its viscosity with the temperature.

Other advantages will be apparent from the following specification taken in connection with the accompanying drawing in which.

Figure 1:
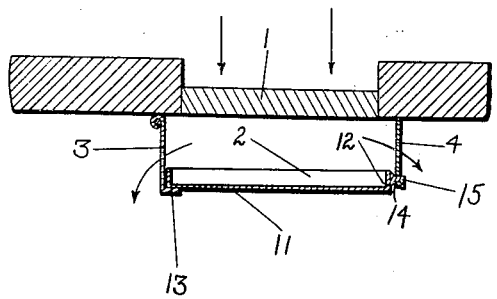
Figure 1 is a vertical sectional view of the filter and the receptacle.

Throughout the several figures of the drawing, 1 indicates the filter which is of any desired type or construction and can also be removably or otherwise secured in place, depending upon the specific service required. This filter is provided with a receptacle 2 having a bottom portion 11 and sides 12, which latter are bent at right angles to the bottom portion. The receptacle is secured in place by means of hinged supports 3 and rigid supports 4. These supports may also consist of a single support, in which case suitable openings are provided to allow for circulation of air. The hinged support has a bent portion 13 adapted to engage with the bottom 11 of the receptacle, and the rigid support 4 has a suitable opening 14 at the lower end into which a hook 15 is adapted to engage, said hook being secured to the side 12 of the receptacle.

Figure 2:
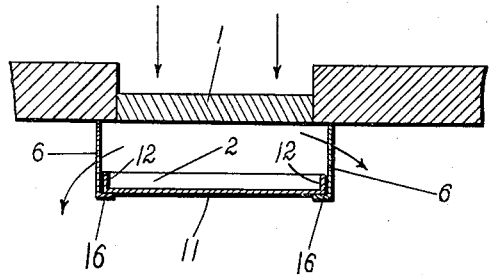
Fig. 2 is a similar view showing another means of attaching the receptacle.

It will thus be apparent that the receptacle can be removed by merely swinging back the support 3 and unhooking it from support 4. The receptacle may also be attached beneath the filter so that it can be slidably removed, as shown in Fig. 2 wherein the receptacle 2 is illustrated as suspended by the supports 6 by means of bent portions 16. The supports are designed in this way in order that the receptacle may be removed for cleaning or other purposes.

Since all of these supports 3, 4 and 6 are arranged at suitable intervals, the air will pass through the filter and past said supports, as indicated by the arrows. Thus any material falling from the filter will drop directly into the receptacle and will not fall on any machinery, etc., which may be under it.

Figure 4:
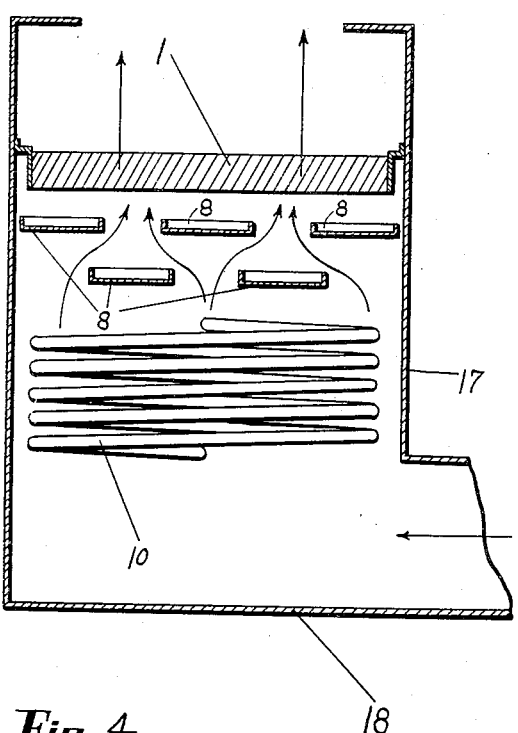
Fig. 4 is a vertical section of a filter combined with a series of receptacles and a heater.
Figure 3:
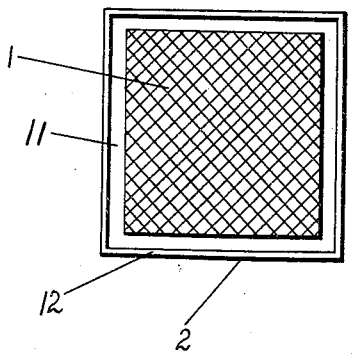
Fig. 3 is a plan view of the filter and the receptacle.
Figure 5:
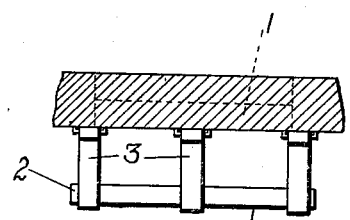
Fig. 5 is a side view of the receptacle and its supports.

In Fig. 4, a filter 1 is shown as mounted in a casing 17, and under this filter a series of receptacles 8 is suitably mounted; but it is to be understood that a single receptacle could be substituted for this series. The receptacles 8 are shown arranged in two rows, the bottom row being arranged to overlap each two receptacles of the upper row. Thus passages are provided between the receptacle of the rows and between the rows as indicated by arrows in Fig. 4. Under the series of receptacles, a heating arrangement is provided in the casing for heating the air entering the casing 17 at inlet 18. This heating arrangement is shown as a coil 10 heated by any suitable means. The air to be cleaned enters through inlet 18, then passes through the coil 10 which is heated, passes between the receptacles, and then through the filter, as indicated by the arrows. Any particles, either liquid or solid, which may become detached from the filter will fall on one of the receptacles and thus will not fall on the coil 10 or other apparatus that may be located under the filter.

The devices under the filter to catch any particles falling therefrom are especially advantageous when an oily filter medium is used, as such medium would change its viscosity due to the heating of the air by coil 10, which would cause the said medium to more easily drop from the filter.

I claim as my invention:—

1. In an air conditioning apparatus, a filter; a plurality of hinged supports; a plurality of fixed supports; and a receptacle associated with said supports positioned under and adapted to receive particles falling from said filter, said receptacle being removably secured by means of said hinged supports.

2. In an air conditioning apparatus, a filter; and a plurality of receptacles arranged in groups so that passages will be formed between the individual receptacles and said filter, and the individual receptacles of a group overlap the receptacles below.

3. In an air conditioning apparatus, a filter; a receptacle associated with and located beneath said filter to receive particles falling therefrom; and means for heating the air passing through said filter, said means being arranged beneath said receptacle to protect it from said filter.

4. In an air conditioning apparatus, a filter; a receptacle comprising a bottom portion and side portions; hooks on one of said side portions; a plurality of hinged supports, each provided with a bent portion; and a plurality of rigid supports each provided with an opening for receiving said hooks, said receptacle being adapted to be secured beneath the filter by means of said supports to receive particles falling from said filter.

5. An air conditioning apparatus comprising a casing; a filter secured in said casing; a plurality of receptacles arranged in said casing beneath said filter and adapted to receive particles falling from said filter; and means in said casing for heating the air passing through the apparatus, said means being arranged beneath said receptacle to protect it from said filter.

In testimony whereof I affix my signature.

KARL G. RUNBACK.